(12) United States Patent
Katsuki et al.

(10) Patent No.: US 6,291,570 B1
(45) Date of Patent: Sep. 18, 2001

(54) HEAT DETERIORATION RESISTANT FLAME RETARDANT, RESIN COMPOSITION AND MOLDED ARTICLE

(75) Inventors: Keiko Katsuki; Takeshi Imahashi; Akira Okada, all of Sakaide (JP)

(73) Assignee: Kyowa Chemical Industry Co Ltd, Kagawa (JP)

(*) Notice: Subject to any disclaimer, the term of this patent is extended or adjusted under 35 U.S.C. 154(b) by 0 days.

(21) Appl. No.: 09/472,963

(22) Filed: Dec. 28, 1999

Related U.S. Application Data

(63) Continuation-in-part of application No. 09/269,076, filed as application No. PCT/JP98/03253 on Jul. 21, 1998, now abandoned.

(30) Foreign Application Priority Data

Jul. 22, 1997 (JP) .................................................. 9-195612

(51) Int. Cl.$^7$ ........................................................ C08K 3/10
(52) U.S. Cl. .................... 524/434; 524/414; 524/424; 524/436; 523/205
(58) Field of Search .................................... 524/414, 424, 524/434, 436; 523/205

(56) References Cited

U.S. PATENT DOCUMENTS

| | | |
|---|---|---|
| 3,650,704 | 3/1972 | Kumura et al. . |
| 3,879,525 | 4/1975 | Miyata et al. . |
| 4,154,718 | 5/1979 | Miyata et al. . |
| 4,299,759 | 11/1981 | Miyata et al. . |
| 4,729,854 | 3/1988 | Miyata et al. . |
| 5,484,583 | 1/1996 | Grubbs et al. . |

FOREIGN PATENT DOCUMENTS

| | | |
|---|---|---|
| 301509A1 | 2/1989 | (EP) . |
| 0780425A1 | 12/1996 | (EP) . |
| B462280 | 1/1971 | (JP) . |
| B4732198 | 8/1972 | (JP) . |
| B4829477 | 9/1973 | (JP) . |
| B5030039 | 9/1975 | (JP) . |
| B5129129 | 8/1976 | (JP) . |
| A5290192 | 7/1977 | (JP) . |
| A580445 | 6/1980 | (JP) . |
| A601241 | 1/1985 | (JP) . |
| A6281435 | 4/1987 | (JP) . |
| A63118374 | 5/1988 | (JP) . |
| A6436654 | 2/1989 | (JP) . |
| 9322237 | 11/1993 | (WO) . |
| 9623727 | 8/1996 | (WO) . |
| 9901509 | 1/1999 | (WO) . |

*Primary Examiner*—Kriellion Sanders

(57) ABSTRACT

There are provided a flame retardant comprising hydrotalcite compound particles which exhibits excellent heat deterioration resistance when it is used as a flame retardant for resins, a resin composition comprising the same and a molded article thereof. There are also provided a heat deterioration resistant flame retardant comprising hydrotalcite compound particles which (i) have an average secondary particle diameter, measured by a laser diffraction scattering method, of 2 μm or less and (ii) contain an iron compound and a manganese compound in a total amount of 0.02 wt % or less in terms of metals, a synthetic resin composition comprising the same and a molded article thereof.

30 Claims, No Drawings

HEAT DETERIORATION RESISTANT FLAME RETARDANT, RESIN COMPOSITION AND MOLDED ARTICLE

CROSS-REFERENCE TO RELATED APPLICATION

This application is a continuation-in-part of co-pending application U.S. Ser. No. 09/269,076 filed Mar. 19, 1999 now abandoned, which is the national stage of PCT/JP98/03253, filed Jul. 21, 1998.

TECHNICAL FIELD OF THE INVENTION

The present invention relates to a heat deterioration resistant flame retardant comprising hydrotalcite compound particles having specific properties and to a substantially halogen-free synthetic resin composition comprising the same in a specific proportion and having heat deterioration resistance and flame retardancy. More specifically, it relates to a heat deterioration resistant flame retardant which comprises hydrotalcite compound particles having specific properties, is almost free from heat deterioration during the thermal molding of a synthetic resin and can provide distinguished heat deterioration resistance and flame retardancy to a resin, and to a substantially halogen-free resin composition comprising the same in a specific proportion.

Stated more specifically, the present invention relates to a substantially halogen-free resin composition which, though it contains a heat deterioration resistant flame retardant in relatively large quantities, rarely undergoes a reduction in physical strength caused by the heat deterioration of a resin at the time of molding or use, and to a molded article thereof which is rarely whitened by heat deterioration. The present invention also relates to a substantially halogen-free resin composition which is excellent in the dispersibility of particles, non-cohesiveness, moldability and physical properties such as impact strength, and to a molded articles thereof.

Prior Art

Flame retardancy has been being required of synthetic resins more increasingly and more strictly each year. To meet this, a flame retarding technology utilizing a halogen-containing resin such as PVC and a flame retarding technology utilizing an organic halide and antimony trioxide in combination have been proposed and widely used. However, as the halogen-containing resin and organic halide flame retardants used in these technologies partly decompose and generate halogen gas during the molding process, they have various problems that they corrode a processing machine and a molding machine, they are toxic for workers, they exert a bad influence upon the heat resistance or weatherability of a resin or rubber, and they generate a large amount of smoke including harmful gas and dioxin at the time of combustion of used molded article.

Therefore, there arises a strong demand for a non-halogen flame retardant having none of the above problems, and attention is now being paid to aluminum hydroxide particles, magnesium hydroxide particles and the like.

However, since aluminum hydroxide particles begin to be dehydrated at a temperature of about 190° C. and cause a foaming trouble in a molded article, the molding temperature must be kept below 190° C. Therefore, the aluminum hydroxide particles have such a problem that the types of usable resins are limited.

As magnesium hydroxide particles have a dehydration start temperature of about 340° C., it has an advantage in that it can be used with almost all types of resins. However, when a synthetic resin molded article containing magnesium hydroxide at a high concentration as a flame retardant is exposed to carbonic acid-containing water, acidic rain or the like for a long time, there occurs a problem that magnesium hydroxide dissolved in an acid separates out on the surface of the article in the form of magnesium carbonate, basic magnesium sulfate or the like to whiten the surface, thereby impairing the appearance of the molded article, and in addition, magnesium hydroxide contained in the resin migrates to the surface of the article gradually, thereby reducing its proper flame retardancy.

On the other hand, hydrotalcite compound particles have been developed as a flame retardant because they have excellent acid resistance (see JP-A 52-90192).

However, the hydrotalcite compound particles have properties suitable for use as a flame retardant molded article when it is filled in a resin, but it has been revealed that the particles have still problems to be solved along with recent growing requirements for properties of the particles.

That is, to fill hydrotalcite compound particles in a synthetic resin and acquire level V-0 in a UL-94 flame retardancy standard with a thickness of ⅛ inch to 1/16 inch, about 150 to 250 parts by weight of the hydrotalcite compound particles must be filled based on 100 parts by weight of the resin. Filling such a relatively large amount of the hydrotalcite compound particles in the synthetic resin promotes the deterioration of a molded article by heating at the time of molding or use and reduces the inherent physical properties, especially such as Izod impact strength, elongation, tensile strength and the like, of the molded article.

It is an object of the present invention, therefore, to provide a novel heat deterioration resistant flame retardant comprising hydrotalcite compound particles, a heat deterioration flame retardant resin composition comprising the same and a synthetic resin, and a molded article thereof.

The inventors of the present invention have conducted studies on the purity and physical properties of hydrotalcite compound particles to attain the above object.

As a result, they have found that the amounts of specific metal compounds as impurities contained in the hydrotalcite compound particles and the value of average secondary particle diameter of the hydrotalcite compound particles have an influence upon the heat deterioration of the resin and that a flame retardant having excellent heat deterioration resistance can be obtained by controlling these values to specific values. The present invention has been accomplished based on these findings.

The hydrotalcite compound particles contains various impurities derived mainly from their source materials during their production process and these impurities are contained in the hydrotalcite compound particles as a solid solution or admixture.

That is, the hydrotalcite compound particles are industrially produced from a magnesium source material, aluminum source material and alkali source material as main source materials, and these source materials mostly rely on natural resources or processed products thereof. Therefore, these source materials contain many kinds of metal compounds and non-metal compounds, and are refined and used in limits that costs permit. However, it is impossible to avoid the inclusion of many kinds of impurities.

During the production process thereof, the elution and inclusion of metals derived from the materials of various apparatuses such as a reactor, container, transport pipes, crystallizer, grinder and the like occur in an unnegligible amount.

The present inventors have conducted studies on components and amounts thereof concerning many kinds of impurities which are derived from its source materials and generate from its production process and contained in the hydrotalcite compound and which have an influence upon heat deterioration and reductions in physical properties when a resin is molded or heat deterioration when a molded article is used. As a result, they have found that when an iron compound and a manganese compound out of the various impurities are contained in trace amounts as an admixture or even as a solid solution, they have an influence upon the heat deterioration of the resin.

They have also found that not only the contents of these specific impurities contained in the hydrotalcite compound particles but also the particle diameter of the hydrotalcite compound particles have a district influence upon heat deterioration. Therefore, it has been found that, to obtain a composition that is filled in a resin and rarely causes deterioration by heat, (i) the amounts of specific metal compounds contained in the hydrotalcite compound particles should be reduced to values smaller than predetermined values and (ii) the average secondary particle diameter of the hydrotalcite compound particles should be reduced to a value smaller than a predetermined value (that is, most of the particles do not agglomerate secondarily).

Thus, according to studies conducted by the present inventors, it has been revealed that a resin composition and a molded article which rarely suffer from reductions in physical properties caused by heat deterioration can be obtained from high-purity hydrotalcite compound particles which contain predetermined amounts or less of an iron compound and a manganese compound and have an average secondary particle diameter of 2 μm or less (that is, most of the particles are primary particles which do not agglomerate secondarily).

Means for Solving the Problems

According to the present invention, the above object of the present invention is attained by a substantially halogen-free flame retardant synthetic resin composition having heat deterioration resistance which comprises (a) a synthetic resin and (b) hydrotalcite compound particles in an amount of more than 10 wt % and 80 wt % or less based on the total weight of the components (a) and (b), said hydrotalcite compound particles being represented by the following formula (1), which (i) have an average secondary particle diameter, measured by a laser diffraction scattering method, of 2 μm or less and (ii) contain an iron compound and a manganese compound in a total amount of 0.02 wt % or less in terms of metals,

$$M_{1-x}Al_x(OH)_2A^{n-}{}_{x/n} \cdot mH_2O \tag{1}$$

wherein M is Mg and/or Zn, $A^{n-}$ is an anion having a valence of n, and x and m are positive numbers satisfying the following expressions:

$$0 < x < 0.5,\ 0 \leq m < 1.$$

According to the present invention, the other object of the present invention is attained by a heat deterioration resistant flame retardant which comprises the above hydrotalcite compound.

The present invention will be described in detail hereinunder.

The hydrotalcite compound particle in the present invention is chemically represented by the following general formula (1).

$$M_{1-x}Al_x(OH)_2A^{n-}{}_{x/n} \cdot mH_2O \tag{1}$$

wherein M is Mg and/or Zn, $A^{n-}$ is an anion having a valence of n, and x and m are positive numbers which satisfy the following expressions:

$$0 < x < 0.5,\ 0 \leq m < 1$$

In the above general formula (1), M is Mg and/or Zn. M is preferably Mg alone or a mixture (solid solution) of Mg and Zn. When M is a mixture of Mg and Zn, the amount of Zn is preferably equal to or smaller than the equivalent of Mg.

In the formula (1), x and m preferably satisfy the following expressions.

$$0.1 < x < 0.4,\ 0 \leq m < 0.7$$

Further, in the formula (1), $A^{n-}$ is an anion having a valence of n. It may be an anion excluding elemental halogen in a hydrotalcite compound and specifically, is preferably $CO_3^{2-}$, $NO_3^-$, $HPO_4^{2-}$, $HO^-$ or an oxyacid anion of S, Si or B. $A^{n-}$ is particularly preferably $CO_3^{2-}$.

To attain the object of the present invention, the hydrotalcite compound particles should have an average secondary particle diameter, measured by a laser diffraction scattering method, of 2 μm or less. That is, most of the particles must be primary particles that did not agglomerate secondarily. The particles preferably have an average secondary particle diameter of 0.4 to 1.0 μm.

Further, each of the hydrotalcite compound particle has a specific surface area, measured by the BET method, of 1 to 30 m²/g, preferably 3 to 20 m²/g, more preferably 3 to 12 m2/g. In addition, when the hydrotalcite compound particle has a ratio of a specific surface area measured by the BET method to a specific surface area measured by a Blaine method being 1 to 6, preferably 1 to 3, the dispersibility of the particles in a resin is advantageously excellent.

Further, the hydrotalcite compound particles of the present invention contain an iron compound and a manganese compound as impurities in a total amount of 0.02 wt % or less, preferably 0.01 wt % or less, in terms of metals (Fe+Mn).

The total content of an iron compound and a manganese compound in the hydrotalcite compound particles of the present invention is within the above range in terms of metals (Fe+Mn). Preferably, the total content of heavy metal compounds including a cobalt compound, chromium compound, copper compound, vanadium compound and nickel compound is within the above range in terms of metals. That is, it is more advantageous that the hydrotalcite compound particles should have a total content of (Fe+Mn+Co+Cr+Cu+V+Ni) as metals of 0.02 wt % or less, preferably 0.01 wt % or less.

As the total content of an iron compound and a manganese compound contained in the hydrotalcite compound particles increases, they cause remarkable reduction in the thermal stability of the blended resin. However, it cannot be said that the heat deterioration resistance of the resin is excellent and the physical properties of the resin are not reduced only when the total amount of the iron compound and the manganese compound satisfies the above range. The average secondary particle diameter of the hydrotalcite compound particles must also satisfy the above range. As the average secondary particle diameter of the hydrotalcite compound particles increases, the contact surface of each particle with the resin decreases and thermal stability improves but mechanical strength lowers and outer appearance deteriorates.

Further, when each of the hydrotalcite compound particles has a specific surface area, measured by the BET method, of more than 30 $m^2/g$, the dispersibility of the particles in the resin lowers and the thermal stability thereof deteriorates.

As described above, when the hydrotalcite compound particles are represented by (i) a chemical structural formula of the above general formula (1) and have (ii) an average secondary particle diameter, (iii) a specific surface area and (iv) a total content of an iron compound and a manganese compound (also a total content of the other metal compounds) within the above respective ranges, there can be obtained a resin composition which satisfies various characteristic properties such as compatibility for a resin, dispersibility, non-cohesiveness, moldability, outer appearance of a molded article, mechanical strength, heat deterioration resistance, flame retardancy and the like.

The method and conditions for producing the hydrotalcite compound particles of the present invention are not limited if hydrotalcite compound particles which satisfy the above requirements (i) to (iv) are obtained. Source materials and production conditions for obtaining the hydrotalcite compound particles are known per se and the hydrotalcite compound particles can be basically produced in accordance with known methods (for example, JP-B 46-2280 and its corresponding U.S. Pat. No. 3,650,704; JP-B 47-32198 and its corresponding U.S. Pat. No. 3,879,525; JP-B 50-30039; JP-B 48-29477 and JP-B 51-29129).

The source materials which are used to mass-produce the hydrotalcite compound particles on an industrial scale are aluminum sulfate or aluminum hydroxide as an aluminum source material, magnesium chloride (such as brine or ion bittern) as a magnesium source material and lime (or a slaked product thereof) as an alkali source material. Most of them are natural resources or processed products thereof.

Most of these industrial raw materials of the hydrotalcite compound particles contain impurity metal compounds such as an iron compound and a manganese compound in no small quantities as will be described later, hydrotalcite compound particles obtained from these raw materials contain these impurity metal compounds as a solid solution or impurity matter, and these impurity metal compounds cannot be removed with a simple means.

Even when raw materials containing impurity metal compounds in small quantities (these are generally expensive) are used, in the industrial-scale production of hydrotalcite compound particles, it is impossible to avoid the inclusion of components derived from the materials of apparatuses such as a reactor, storage tank, transport pipes, crystallizer, grinder, drier and the like. Since the production process of the hydrotalcite compound particles comprises the step of a reaction under an alkali condition and the step of heating and aging for a long time, the inclusion of impurity metal compounds such as an iron compound occurs inevitably without special attention being paid to the materials of the apparatuses.

To this end, special attention must be paid to obtain hydrotalcite compound particles having extremely small contents of an iron compound and a manganese compound. That is, it is necessary (i) to select and use raw materials in which impurity metal compounds such as an iron compound and a manganese compound are removed in advance or which have small contents of these impurity metal compounds and (ii) to use apparatuses made from materials from which impurity metal compounds rarely elute or enter into the particles in the production process of hydrotalcite compound particles.

U.S. Pat. No. 3,650,704 discloses hydrotalcite compound particles having a heavy metal impurity content of 30 ppm or less. The above special hydrotalcite particles are synthesized hydrotalcite compound particles for use as a gastric antacid which are highly purified in order to be administered to human bodies, and have a high antacidic effect. This patent teaches that the inclusion of impurities harmful to human bodies can be prevented by carefully selecting the class of the raw material (second column, lines 12 to 26) but fails to give a specific and detailed description of the class of the raw material. This patent merely specifies the total content of heavy metal impurities in the hydrotalcite compound particles as a medicine. The hydrotalcite compound particles are obtained from special raw materials using special small-sized apparatuses (such as a glass vessel and a glass-lined apparatus).

The hydrotalcite compound particles of the present invention are obtained by removing impurity metal compounds such as an iron compound and a manganese compound from raw materials or selecting and using raw materials having small contents of these impurity metal compounds. To produce the hydrotalcite compound particles, apparatuses made from alkali resistant and acid resistant materials from which an iron compound and a manganese compound, especially an iron compound, rarely elute and generate should be selected.

The hydrotalcite compound particles of the present invention are a resin additive which is used in industrial fields and must be inexpensive. Therefore, it is not advisable to purify all of the aluminum source material, magnesium source material and alkali source material excessively because this boost costs.

Thus, a resin composition which satisfies requirements for an increase in the quality of the resin, that is, for high heat deterioration resistance and flame retardancy, can be provided by obtaining the hydrotalcite compound particles of the present invention particles which contain mainly no iron compound and no manganese compound and have a specified average particle diameter and a specified specific surface area.

Stated more specifically, for the production of the hydrotalcite compound particles of the present invention, sea water, natural brine or ion bittern from which an iron compound and a manganese compound have been removed with purification means can be used as a magnesium source material, and aluminum sulfate or aluminum chloride for industrial use can be used as an aluminum source material.

Further, caustic soda for industrial use is suitable for use as an alkali source material, while natural lime is not preferred because it is difficult to be purified. Soda carbonate or carbonic acid gas for industrial use can be used as a source material for carbonic acid ions. The composition of each of the source materials, especially the content of an iron compound and the content of a manganese compound will be specifically described in Examples given hereinafter. The material of each apparatus will also be described hereinafter.

The hydrotalcite compound particles used in the present invention can be blended with a synthetic resin directly or after each particle is surface-treated with a surface treatment agent. The latter is generally preferred.

The surface treatment agent is at least one member selected from the group consisting of higher fatty acids, anionic surfactants, phosphoric acid esters, coupling agents (silane-, titanate- and aluminum-based) and esters of polyhydric alcohols and fatty acids.

Preferred examples of the surface treatment agent include higher fatty acids having 10 or more carbon atoms such as stearic acid, erucic acid, palmitic acid, lauric acid and behenic acid; alkali metal salts of the higher fatty acids;

sulfuric ester salts of higher alcohols such as stearyl alcohol and oleyl alcohol; anionic surfactants such as sulfuric ester salts, amide bonded sulfuric ester salts, ester bonded sulfuric ester salts, ester bonded sulfonates, amide bonded sulfonates, ether bonded sulfonates, ether bonded alkyl aryl sulfonates, ester bonded alkyl aryl sulfonates and amide bonded alkyl aryl sulfonates of polyethylene glycol ethers; phosphoric acid esters such as mono- or di-esters from orthophosphoric acid and oleyl alcohol, stearyl alcohol and the like or mixtures thereof or alkali metal salts and amine salts thereof; silane coupling agents such as vinylethoxysilane, vinyl-tris(2-methoxy-ethoxy)silane, γ-methacryloxypropyl trimethoxysilane, γ-aminopropyl trimethoxysilane, β-(3,4-epoxycyclohexyl)ethyl trimethoxysilane, γ-glycidoxypropyl trimethoxysilane and γ-mercaptopropyl trimethoxysilane; titanate-based coupling agents such as isopropyltriisostearoyl titanate, isopropyltris (dioctylpyrophosphate)titanate, isopropyltri(N-aminoethyl-aminoethyl)titanate and isopropyltridecylbenzenesulfonyl titanate; aluminum-based coupling agents such as acetoalkoxyaluminium diisopropylate; and esters of polyhydric alcohols and fatty acids such as glycerin monostearate and glycerin monooleate.

The surface of each hydrotalcite compound particle can be coated using the above surface treatment agents in accordance with a wet or dry process known per se. For instance, the wet process comprises adding the surface treatment agent in a state of a liquid or emulsion to a slurry of hydrotalcite compound particles and fully mixing these mechanically at a temperature up to about 100° C. The dry process comprises adding the surface treatment agent in a state of a liquid, emulsion or solid to hydrotalcite compound particles while the hydrotalcite compound particles are fully stirred with a mixer such as a Henschel mixer and fully mixing these under heating or without heating. The amount of the surface treatment agent added can be suitably selected but is preferably about 10 wt % or less based on the weight of the hydrotalcite compound particles.

The surface-treated hydrotalcite compound particles may be washed with water, dehydrated, granulated, dried, ground or classified as required to prepare an end product thereof. The hydrotalcite compound particles of the present invention are filled in a resin in an amount of more than 10 wt % and 80 wt % or less, preferably 15 to 75 wt % based on the total weight of the halogen-free synthetic resin (a) and the hydrotalcite compound particles (b).

The halogen-free synthetic resin to be filled with the hydrotalcite compound particles of the present invention is a halogen-free thermoplastic synthetic resin which is generally used as a molded article, as exemplified by polymers and copolymers of olefins having 2 to 8 carbon atoms (α-olefins) such as polyethylene, polypropylene, ethylene/propylene copolymer, polybutene and poly·4-methylpentene-1, copolymers of these olefins and dienes, ethylene-acrylate copolymer, polystyrene, ABS resin, AAS resin, AS resin, MBS resin, ethylene-vinyl acetate copolymer resin, vinyl acetate resin, phenoxy resin, polyacetals, polyamides, polyimides, polycarbonates, polysulfones, polyphenylene oxide, polyphenylene sulfide, polyethylene terephthalate, polybutylene terephthalate, methacrylic resins and thermoplastic elastomers.

Of these thermoplastic resins, polyolefins and copolymers thereof which are provided with an excellent heat deterioration prevention effect and mechanical strength retaining characteristics by the hydrotalcite compound particles are preferred, as exemplified by polypropylene-based resins such as polypropylene homopolymer and ethylene-propylene copolymer, polyethylene-based resins such as high-density polyethylene, low-density polyethylene, straight chain low-density polyethylene, ultra low-density polyethylene, EVA (ethylene vinyl acetate resin), EEA (ethylene ethyl acrylate resin), EMA (ethylene-methyl acrylate copolymer resin), EAA (ethylene-acrylic acid copolymer resin) and ultra high molecular weight polyethylene, and polymers and copolymers of olefins having 2 to 6 carbon atoms (α-ethylenes) such as polybutene and poly·4-methylpentene-1.

Further, thermosetting resins such as epoxy resins, phenolic resins, melamine resins, unsaturated polyester resins, alkyd resins and urea resins and synthetic rubber such as EPDM, butyl rubber, isoprene rubber, SBR and NBR may also be used as the synthetic resin.

The synthetic resin used in the present invention is not limited by its production process. In the case of a polyolefin, the production process is selected from a Ziegler process, Ziegler-Natta process, Friedel-Craft process, metallocene process and Phillips process according to polymerization catalyst.

The resin composition of the present invention substantially comprises the above synthetic resin (a) and the above hydrotalcite compound particles (b) and may further contain a small amount of a flame retardant aid (c). When the resin composition contains this flame retardant aid (c), the proportion of the hydrotalcite compound particles (b) can be reduced and the flame retarding effect can be improved.

The flame retardant aid (c) is preferably red phosphorus powder, carbon powder or a mixture thereof. As the red phosphorus may be used general red phosphorus for use as a flame retardant and red phosphorus coated with a thermosetting resin, polyolefin, carbonic acid polymer, titanium oxide or titanium-aluminum condensate. The carbon powder is carbon black, activated carbon or graphite, and the carbon black is prepared by an oil furnace process, gas furnace process, channel process, thermal process or acetylene process.

When the flame retardant aid (c) is used, the amount thereof is 0.5 to 20 wt %, preferably 1 to 15 wt % based on the total weight of the synthetic resin (a) and the hydrotalcite compound particles (b).

To improve the strength of the resin composition, a polymer-alloy compatibilizing agent may be used in the present invention. Illustrative examples of the polymer-alloy compatibilizing agent include maleic anhydride modified styrene-ethylene-butylene resin, maleic anhydride modified styrene-ethylene-butadiene resin, maleic anhydride modified polyethylene, maleic anhydride modified EPR, maleic anhydride modified polypropylene, carboxyl modified polyethylene, epoxy modified polystyrene/PMMA, polystyrene-polyimide block copolymer, polystyrene-methyl polymethacrylate block copolymer, polystyrene-polyethylene block copolymer, polystyrene-ethyl acrylate graft copolymer, polystyrene-polybutadiene graft copolymer, polypropylene-ethylene-propylene-diene graft copolymer, polypropylene-polyamide graft copolymer, ethyl polyacrylate-polyamide graft copolymer and the like.

The resin composition having heat deterioration resistance and flame retardancy of the present invention may contain other commonly used additives in addition to the above components. The additives include an antioxidant, antistatic agent, pigment, foaming agent, plasticizer, filler, reinforcement, crosslinking agent, light stabilizer, nucleating agent, ultraviolet absorber, lubricant, other inorganic and organic flame retardants and the like.

To prepare the composition of the present invention, means of filling the hydrotalcite compound particles in the resin is not particularly limited. For example, the hydrotalcite compound particles may be filled in the synthetic resin together with other resin compounding ingredients or separately from these as uniformly as possible by the same means as commonly used known means of filling a stabilizer or filler in these resins. For example, the means may be known mixing means such as a ribbon blender, high-speed mixer, kneader, pelletizer or extruder for filling these components, or means of adding a suspension of a flame retardant comprising hydrotalcite compound particles as an effective ingredient to a slurry after polymerization, stirring, mixing and drying.

Accordingly, the present invention can provide a substantially halogen-free flame retardant resin composition by filling the above hydrotalcite compound particles in a synthetic resin as well as a molded article thereof.

Even when the synthetic resin is halogen-free, halogen derived from raw materials and a catalyst may remain in the resin in a small quantity.

Additives such as an ultraviolet absorber, colorant, foaming inhibitor and the like which are added in small quantities may be halides.

In the present invention, a small amount of halogen derived from these additives is removed and the disuse of halogen-containing additives is not intended.

Although the object of the present invention is attained without using the above halides as a matter of course, it is the best not to use such halides.

That is, even when halide additives are used, it is desirable to reduce the total content of the halides in the resin composition or molded article to 1 wt % or less, preferably 0.1 wt % or less, more preferably 0.01 wt % or less in terms of elemental halogen.

As a matter of course, a resin having elemental halogen in the molecular structure and an organic halide flame retardant are not used in the present invention even when the total content of halides in the resin composition is 1 wt % or less in terms of elemental halogen because it is against the subject matter of the present invention.

EXAMPLES

The following examples are given to further illustrate the present invention. "%" means wt %, excepting that the proportion of an antioxidant is a proportion (%) based on the total weight of the synthetic resin (a), the hydrotalcite compound particles (b) and the flame retardant aid (c).

In the following examples, the average secondary particle diameter (a) and the BET specific surface area (b) of the hydrotalcite compound particles were the values measured by the following measurement methods.

(1) Average secondary particle diameter of hydrotalcite compound particles

This is measured and determined using the SPA type MICROTRAC particle size analyzer of LEEDS & NORTHRUP INSTRUMENTS CO., LTD.

700 mg of sample powder is added to 70 ml of water and dispersed with ultrasonic waves (Model US-300 of NISSEI CO., LTD. with a current of 300 $\mu$A) for 3 minutes and then, 2 to 4 ml of the resulting dispersion is collected and added to the sample chamber containing 250 ml of deaerated water, of the above particle size analyzer. The analyzer is operated to circulate the suspension for 8 minutes to measure a particle size distribution. The particle size distribution is measured twice in total and the arithmetic mean value of 50% cumulative secondary particle diameters obtained by the above measurements is calculated and taken as the average secondary particle diameter of the sample.

(2) BET specific surface area of hydrotalcite compound particles

This is measured in accordance with a liquid nitrogen adsorption method.

(3) Izod impact strength

This is measured in accordance with JIS K7110.

(4) Tensile strength

This was measured in accordance with JIS K7113.

(5) Flame retardancy

A test piece is immersed in ion exchange water at 40° C. for 10 days, taken out in the air and measured in accordance with the UL 94VE method and UL 94HB method.

(6) Analysis of metals

This is measured by ICP-MS (Inductively Coupled Plasma-Mass Spectrometry).

(7) Analysis of halogen contained in resin molded article

The total content of Cl and Br contained in a resin molded article is analyzed with a fluorescent X-ray device.

I. Preparation and Properties of Hydrotalcite Compound Particles

I-(1) chemical structural formulas of hydrotalcite compound particles;

The chemical structural formulas and sample Nos. of hydrotalcite compound particles prepared in the following Examples 1 and 2 and Comparative Examples 1 to 5 are shown below.

| sample number | chemical structural formula |
|---|---|
| A-I | $Mg_{0.7}Al_{0.3}(OH)_2(CO_3)_{0.15} \cdot 0.5H_2O$ |
| A-II | $Mg_{0.5}Zn_{0.2}Al_{0.3}(OH)_2(CO_3)_{0.15} \cdot 0.55H_2O$ |
| B-I | $Mg_{0.7}Al_{0.3}(OH)_2(CO_3)_{0.15} \cdot 0.5H_2O$ |
| B-II | $Mg_{0.7}Al_{0.3}(OH)_2(CO_3)_{0.15} \cdot 0.55H_2O$ |
| B-III | $Mg_{0.4}Zn_{0.3}Al_{0.3}(OH)_2(CO_3)_{0.15} \cdot 0.55H_2O$ |
| B-IV | $Mg_{0.7}Al_{0.3}(OH)_2(CO_3)_{0.15} \cdot 0.55H_2O$ |
| B-V | $Mg_{0.7}Al_{0.3}(OH)_2(CO_3)_{0.15} \cdot 0.55H_2O$ |

I-(2) kind and properties of each raw material

The properties of each raw material used in the following Examples 1 and 2 and Comparative Examples 1 to 5 for the preparation of hydrotalcite compound particles are shown below.

| | raw material No. 1: unpurified brine | raw material No. 2: purified brine | raw material No. 3: ion bittern | raw material No. 4: aluminum sulfate | raw material No. 5: zinc chloride |
|---|---|---|---|---|---|
| $MgCl_2$ g/L | 314.6 | 312.1 | 168.2 | | |
| $CaCl_2$ g/L | | | 68.3 | | |
| $ZnCl_2$ g/L | | | | | 572.7 |
| $Al_2O_3$ g/L | | | | 106.8 | |

-continued

| | | | | | |
|---|---|---|---|---|---|
| Fe mg/L | 89.2 | 1≧ | 1≧ | 10 | 1≧ |
| Mn mg/L | 3.5 | 1≧ | 1≧ | 0.5≧ | 13.9 |

| | raw material No. 6: aqueous solution of caustic soda | raw material No. 7: sodium carbonate | raw material No. 8: slaked product of natural lime | raw material No. 9: water | raw material No. 10: sodium stearate |
|---|---|---|---|---|---|
| NaOH % | 48.7 | | | | |
| Na$_2$CO$_3$ % | | 99.9 | | | |
| Ca(OH)$_2$ % | | | 96.1 | | |
| C$_{17}$H$_{36}$COONa % | | | | | 93.4 |
| Fe % | 0.001 | 0.002 | 0.07 | 0.0001≧ | 0.0003 |
| Mn % | 0.0001≧ | 0.0001≧ | 0.003 | 0.0001≧ | 0.0001≧ |

| | raw material No. 11: aluminum hydroxide |
|---|---|
| Al(OH)$_3$ % | 99.7 |
| Fe % | 0.0035 |
| Mn % | 0.0001 |

Example 1
(Preparation of Hydrotalcite Compound Particles A-1)

Purified brine (raw material No. 2) was transferred to a concentration control tank and aluminum sulfate (raw material No. 4) was added to the purified brine to prepare a mixed aqueous solution (A) having an Mg concentration of 1.95 mol/L(liter) and an Al concentration of 0.847 mol/L. Thereafter, caustic soda (raw material No. 6) was transferred to another concentration control tank and sodium carbonate powder (raw material No. 7) and water (raw material No. 9) were added to prepare an aqueous solution (B) having an NaOH concentration of 3 mol/L and an Na$_2$CO$_3$ concentration of 0.23 mol/L.

The mixed aqueous solution (A) and the aqueous solution (B) were injected in a proportion of (A):(B)=1.18:2.2 (liters) into a reactor containing water at the same time under agitation to ensure that the residence time was 60 minutes so as to obtain a reaction slurry of hydrotalcite (H.T.). 800 Liters of this reaction slurry was collected and transferred to an autoclave to be aged by heating at 170° C. for 20 hours under agitation. After cooling, the slurry was transferred to a surface treatment tank and heated up to 80° C. under agitation, and 2 kg of sodium stearate (raw material No. 10) dissolved in 50 liters of hot water heated at 80° C. was poured into the tank little by little and stirred for 30 minutes to complete a surface treatment. A solid material was separated by filtration, washed, dried with a hot air drier and ground with a hammer mill to prepare a sample.

When the obtained hydrotalcite was analyzed, the composition thereof was found to be

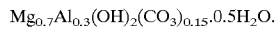

Mg$_{0.7}$Al$_{0.3}$(OH)$_2$(CO$_3$)$_{0.15}$·0.5H$_2$O.

Apparatuses used were made from the following materials.
1. raw material tank (for brine): SUS 304 lined with FRP
2. raw material tank (for aluminum sulfate): SUS 304 lined with FRP
3. concentration control tank (for brine+aluminum sulfate): SUS 304 lined with FRP
4. raw material tank (for caustic soda): SUS 304
5. concentration control tank (for caustic soda+sodium carbonate): SUS 304
6. transport pipe (for brine and mixed solution): PVC pipe
7. transport pipe (for caustic soda and mixed solution): SUS 304
8. transport pipe (for hydrothermally treated material): SUS 316L
9. reactor and autoclave: SUS 304 lined with Hastelloy C276
10. stirrer: SUS 316L
11. filter, drier and mill: SUS 304

Purification Method for Natural Underground Brine

The above purified brine (raw material No. 2) was obtained by purifying natural brine (raw material No. 1) in accordance with the following method.

Iron and manganese contained in brine collected from the ground are present in the forms of divalent ions or trivalent ions, colloidal iron and the like. To remove iron and manganese, the brine was oxidized by aeration and then with chlorine. The obtained oxide was condensed and separated by filtration to obtain purified brine (raw material No. 2).

Example 2
(Preparation of Hydrotalcite Compound Particles A-II)

A reaction was carried out in the same manner as in Example 1 using completely the same apparatuses as in Example 1 except that ion bittern and zinc chloride were used in place of the purified brine out of the raw materials. That is, ion bittern (raw material No. 3) was transferred to a concentration control tank and zinc chloride (raw material No. 5) and aluminum sulfate (raw material No. 4) were added to prepare a mixed aqueous solution having an Mg concentration of 1.05 mol/L, a Zn concentration of 0.42 mol/L and an Al concentration of 0.63 mol/L. At this point, calcium sulfate was precipitated in the mixing tank and separated by filtration to obtain a filtrate (A). Thereafter, caustic soda (raw material No. 6) was transferred to another concentration control tank, and sodium carbonate powder (raw material No. 7) and water (raw material No. 9) were added to prepare an aqueous solution (B) having an NaOH concentration of 3 mol/L and an Na$_2$CO$_3$ concentration of 0.225 mol/L.

The solution (A) and the solution (B) were injected in a proportion of (A):(B)=1:1.4 (liters) into a reactor containing water at the same time under agitation to ensure that the residence time was 60 minutes so as to obtain a reaction slurry of hydrotalcite (H.T.).

800 Liters of this reaction slurry was collected and transferred to an autoclave to be aged by heating at 140° C.

for 10 hours under agitation. After cooling, the slurry was transferred to a surface treatment tank and heated up to 80° C. under agitation, and 1.3 kg of sodium stearate (raw material No. 10) dissolved in 50 liters of hot water heated at 80° C. was poured into the tank little by little and stirred for 30 minutes to complete a surface treatment. A solid material was separated by filtration, washed, re-emulsified, spray-dried to prepare a sample.

When the obtained hydrotalcite was analyzed, the composition thereof was found to be $$Mg_{0.5}Zn_{0.2}Al_{0.3}(OH)_2(CO_3)_{0.15}\cdot 0.55H_2O.$$

Comparative Example 1
(Preparation of Hydrotalcite Compound Particles B-I)

A reaction slurry of hydrotalcite was obtained using the same apparatuses and the same raw materials in the same concentrations as in Example 1 except that unpurified brine (raw material No. 1) was used in place of purified brine.

800 Liters of this slurry was collected, aged by heating, surface-treated with sodium stearate and subjected to the same process as in Example 1 to prepare a sample.

When the hydrotalcite was analyzed, the composition thereof was found to be $$Mg_{0.7}Al_{0.3}(OH)_2(CO_3)_{0.15}\cdot 0.5H_2O.$$

Comparative Example 2
(Preparation of Hydrotalcite Compound Particles B-II)

A product was obtained in the same manner as in Example 1 except that the reactor, autoclave and surface treatment tank were made of a carbon steel plate for medium and normal pressure vessels (SGP material, JIS G3118-1977) and all the transport pipes were carbon steel pipes (SGP material, JIS G3452-1984).

When the obtained hydrotalcite was analyzed, the composition thereof was found to be $$Mg_{0.7}Al_{0.3}(OH)_2(CO_3)_{0.15}\cdot 0.55H_2O.$$

Comparative Example 3
(Preparation of Hydrotalcite Compound Particles B-III)

Slaked lime (raw material No. 8) obtained from natural lime was transferred to a concentration control tank to obtain a slurry having a Ca(OH)$_2$ concentration of 200 g/L. Meanwhile, purified brine (raw material No. 2) was transferred to another concentration control tank and water (raw material No. 9) was added to prepare an aqueous solution having an Mg concentration of 2 mol/L. The aqueous solution was transferred to a reactor and 0.726 liter of the Ca(OH)$_2$ aqueous solution was added to 1 liter of the Mg aqueous solution little by little under agitation. The obtained slurry of magnesium hydroxide was dehydrated with a filter and washed with water, and water was added to re-emulsify the slurry so as to obtain a slurry having a magnesium hydroxide concentration of 50 g/L. 35.1 Liters of zinc chloride (raw material No. 5) and 70.9 liters of aluminum sulfate (raw material No. 4) were added to 229.4 liters of the magnesium hydroxide slurry under agitation, and 327.9 liters of caustic soda with a concentration of 3 mol/L in which 7.83 kg of sodium carbonate was dissolved, was injected little by little to obtain a mixed slurry. To this slurry was added water to prepare 800 liters of the aqueous solution which was then transferred to an autoclave to be aged by heating at 150° C. for 6 hours under agitation to obtain a hydrotalcite slurry. After cooling, the slurry was transferred to a surface treatment tank and heated up to 80° C. under agitation, and 0.75 kg of sodium stearate (raw material No. 10) dissolved in 50 liters of hot water heated at 80° C. was poured into the tank little by little and stirred for 30 minutes to complete a surface treatment. A solid material was separated by filtration, washed, dried with hot air and ground to prepare a sample.

The reactor, autoclave and surface treatment tank were made of a carbon steel plate for medium and normal pressure containers (SGP material, JIS G3118-1977) and all the transport pipes are carbon steel pipes (SGP material, JIS G3452-1984).

When the obtained hydrotalcite was analyzed, the composition thereof was found to be $$Mg_{0.4}Zn_{0.3}Al_{0.3}(OH)_2(CO_3)_{0.15}\cdot 0.55H_2O.$$

Comparative Example 4
(Preparation of Hydrotalcite Compound Particles B-IV)

Slaked lime (raw material No. 8) obtained from natural lime was transferred to a concentration control tank to obtain a slurry having a Ca(OH)$_2$ concentration of 200 g/L. Meanwhile, purified brine (raw material No. 2) was transferred to another concentration control tank and water (raw material No. 9) was added to prepare an aqueous solution having an Mg concentration of 2 mol/L. The aqueous solution was transferred to a reactor, and the Ca(OH)$_2$ aqueous solution was added to the Mg aqueous solution in a proportion of the Ca(OH)$_2$ aqueous solution the Mg aqueous solution=0.726:1 (liter) little by little under agitation. The obtained slurry of magnesium hydroxide was dehydrated with a filter and washed with water, and water was added to re-emulsify the slurry so as to obtain a slurry having a magnesium hydroxide concentration of 100 g/L. 17.01 kilograms of aluminum hydroxide (raw material No. 11), 11.54 kilograms of sodium carbonate (raw material No. 7) dissolved in water and water (raw material No. 9) were added to 295.7 liters of the magnesium hydroxide slurry under agitation to prepare 800 liters of a mixed slurry.

This mixed slurry was then transferred to an autoclave to be aged by heating at 180° C. for 20 hours under agitation to obtain a hydrotalcite slurry. After cooling, the slurry was transferred to a surface treatment tank to carry out an agitation treatment using 1.7 kg of sodium stearate in the same manner as in Example 1. Apparatuses similar to those of Example 1 were used.

When the obtained hydrotalcite was analyzed, the composition thereof was found to be $$Mg_{0.7}Al_{0.3}(OH)_2(CO_3)_{0.15}\cdot 0.55H_2O.$$

Comparative Example 5
(Preparation of Hydrotalcite Compound Particle B-V)

Purified brine (raw material No. 2) was transferred to a concentration control tank and aluminum sulfate (raw material No. 4) was added to prepare a mixed aqueous solution (A) having a Mg concentration of 1.95 mol/L and an Al concentration of 0.847 mol/L. Thereafter, caustic soda (raw material No. 6) was transferred to another concentration control tank and sodium carbonate powder (raw material No. 7) and water were added to prepare an aqueous solution (B) having an NaOH concentration of 3 mol/L and an Na$_2$CO$_3$ concentration of 0.23 mol/L.

The mixed aqueous solution (A) and the aqueous solution (B) were injected in a proportion of (A):(B)=1.18:2.2 (liters) into a reactor containing water at the same time under agitation to ensure that the residence time was 60 minutes so as to obtain a reaction slurry of hydrotalcite. 800 Liters of this reaction slurry was transferred to a surface treatment tank and heated to 80° C. under agitation and 2 kg of sodium stearate (raw material No. 10) dissolved in 50 liters of hot water heated at 80° C. was injected into the tank little by little and stirred for 30 minutes to complete a surface treatment. A solid material was separated by filtration, washed, dried with hot air and ground to prepare a sample.

When the obtained hydrotalcite was analyzed, the composition thereof was found to be

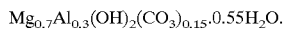
$Mg_{0.7}Al_{0.3}(OH)_2(CO_3)_{0.15}\cdot 0.55H_2O$.

Apparatuses similar to those of Example 1 were used.

The properties and metal contents of the hydrotalcite compound particles obtained in the above Examples 1 and 2 and Comparative Examples 1 to 5 are shown in Table 1 below.

185° C., and the obtained mixture was dried at 120° C. for 4 hours and molded at 185° C. by an injection molding machine.

twin-screw extruder: BT-30-S2-30-L of Research Laboratory of Plastic Technology Co., LTD.

injection molding machine: FS 120S 18A SE of Nissei Plastic Industrial Co., LTD.

(ii) Measurement of Thermal Stability apparatus: GPHH-100 gear oven of Tabai Espec Co., Ltd.

setting conditions: at 150° C., damper opening of 50%

Two test pieces as a set were sandwiched at their upper portion between a folded paper, clipped with a metal clip, hung by a rotary ring and extracted after a certain elapse of time.

test piece: 12.7×12.7×2.1 mm evaluation: A time elapsed before the whitening of the test pieces was observed was taken as a measure for heat deterioration. Further, a time elapsed before the weight of

TABLE 1

| composition and properties | sample | | | | | | |
|---|---|---|---|---|---|---|---|
| | Ex. 1 | Ex. 2 | C. Ex. 1 | C. Ex. 2 | C. Ex. 3 | C. Ex. 4 | C. Ex. 5 |
| hydrotalcite compound particles | A-I | A-II | B-I | B-II | B-III | B-IV | B-V |
| average secondary particle diameter ($\mu$m) | 0.6 | 0.7 | 0.6 | 0.6 | 2.1 | 1.3 | 4.7 |
| specific surface area (m$^2$/g) | 8.5 | 5.3 | 8.7 | 8.9 | 16.0 | 6.5 | 60 |
| purity of hydrotalcite compound (%) | 99.89 | 99.82 | 99.65 | 99.59 | 99.35 | 99.60 | |
| Fe (%) | 0.0019 | 0.0072 | 0.0265 | 0.0376 | 0.0551 | 0.0490 | 0.0025 |
| Mn (%) | 0.0004 | 0.0004 | 0.0010 | 0.0007 | 0.003 | 0.003 | 0.0004 |
| Cu (%) | 0.0001≥ | 0.0001≥ | 0.0001≥ | 0.0001≥ | 0.0001≥ | 0.0001≥ | 0.0001≥ |
| V (%) | 0.0001≥ | 0.0001≥ | 0.0001≥ | 0.0001≥ | 0.0001≥ | " | " |
| Co (%) | 0.0001≥ | 0.0001≥ | 0.0001≥ | 0.0001≥ | 0.0001≥ | " | " |
| Ni (%) | 0.0001≥ | 0.0001≥ | 0.0001≥ | 0.0001≥ | 0.0001≥ | " | " |
| Cr (%) | 0.0001≥ | 0.0001≥ | 0.0001≥ | 0.0001≥ | 0.0001≥ | " | " |

Ex.: Example,
C. Ex.: Comparative Example

II Preparation and Evaluation of Physical Properties of Resin Compositions

Examples 3 and 4
and

Comparative Examples 6 to 10

(Evaluation of Thermal Stability and Physical Properties of Resin Compositions)

Test pieces having the following compositions were prepared using hydrotalcite compound particles shown in Table 1 of the above Examples 1 and 2 and Comparative Examples 1 to 5.

50%: hydrotalcite compound particles (surface-treated with 3wt % of stearic acid)

50%: polypropylene (of an impact resistant grade having an MFI of 2 g/10 min)

0.1%: antioxidant (Irganox 1010 of Ciba-Geigy AG.)

0.1%: antioxidant (DLTP of Yoshitomi Pharmaceutical Industries, Ltd.)

0.3%: Bis(P-ethylbenzylidene)sorbitol (nucleating agent)

(i) Preparation of Test Piece

The surface-treated hydrotalcite compound particles of each sample were pretreated and dried at 105° C. for 16 hours and then at 150° C. for 4 hours to remove water adhered thereto, and kneaded with a resin (polypropylene), antioxidant and nucleating agent by a twin-screw extruder at the test piece was reduced by 10% at 150° C. was also measured. An Izod impact test piece and a tensile test piece which were heated at 150° C. for 7 days were left at 23° C.±2° C. and 50%±5% RH for 4 days to measure Izod impact strength and tensile strength.

(iii) Evaluation Results

Evaluation results are shown in Table 2 below.

Comparative Example 11

A composition was prepared in the same manner as in Example 1 except that the amount of hydrotalcite compound particles was changed to 5 wt % and the amount of polypropylene was changed to 95 wt % and a test piece having a thickness of ⅛ inch for an UL 94 HB test was prepared from the composition in the same manner as in Example 1.

The UL 94 HB test results of the test piece were below the standards.

TABLE 2

| | Ex. 3 | Ex. 4 | C. Ex. 6 | C. Ex. 7 | C. Ex. 8 | C. Ex. 9 | C. Ex. 10 |
|---|---|---|---|---|---|---|---|
| hydrotalcite compound particles | A-I | A-II | B-I | B-II | B-III | B-IV | B-V |
| number of days before whitening | 20 | 16 | 3 | 2 | 1 | 1.5 | 5 |
| Izod impact strength (notched, kgf cm/cm) | 15.2 | 17.3 | 14.0 | 13.5 | 11.2 | 13.6 | 1.3 |
| tensile strength (kgf/mm$^2$) | 2.38 | 2.45 | 2.08 | 2.03 | 1.93 | 2.01 | 1.42 |
| flame retardancy test (UL 94 HB ⅛ inch) | passed | passed | passed | passed | passed | passed | passed |
| 10 wt % weight reduction (hours) | 520 | 420 | 120 | 100 | 50 | 60 | 160 |
| Izod impact strength 150° C. × 7 days (notched, kgf cm/cm) | 14.5 | 15.8 | 1≧ | 1≧ | 1≧ | 1≧ | 1≧ |
| tensile strength 150° C. × 7 days (kgf cm/cm) | 2.33 | 2.40 | 0.5≧ | 0.5≧ | 0.5≧ | 0.5≧ | 0.5≧ |
| content of halogen (wt %) | 0.001 | 0.003 | 0.001 | 0.003 | 0.001 | 0.001 | 0.003 |

Ex.: Example,
C. Ex.: Comparative Example

Example 5 and

Comparative Example 12

A resin composition having the following composition as prepared.

90 parts by weight: ethylene-vinyl acetate copolymer (containing 41% of vinyl acetate)
10 parts by weight: polymer alloy compatibilizing agent (Taftec M-1943 of Asahi Chemical Industry Co., Ltd.)
150 parts by weight: hydrotalcite compound particles (A-I or B-I; surface-treated with 0.25 part by weight of sodium oleate based on 100 parts by weight of the hydrotalcite compound particles)
2 parts by weight: DCP (dicumyl peroxide)
1 part by weight: silane coupling agent (NUC A-172)
1 part by weight: antioxidant (Irganox 1010 of Ciba-Geigy AG.)

Preparation of Test Piece

The resin composition was kneaded with a single-screw kneading extruder at 120° C.

The resulting extrudate was Pre-molded by a compression molding machine at 120° C. for 5 minutes and crosslinked at 180° C. for 15 minutes to obtain 2 mm-thick and 6.36 mm-thick plates.

Measurement of Thermal Stability heat resistance: A test piece having a width of 25 mm and a length of 50 mm was obtained from the 2 mm-thick crosslinked plate and a heat resistance test was made on the test piece in the same manner as in Example 1.
tensile strength: A JIS7113 No. 2 test piece was prepared and measured for its tensile strength at a test rate of 200 mm/min.

Evaluation Results

Measurement results are shown in Table 3 below.

TABLE 3

| | Ex. 5 | C. Ex. 12 |
|---|---|---|
| hydrotalcite compound particles | A-I | B-I |

TABLE 3-continued

| | Ex. 5 | C. Ex. 12 |
|---|---|---|
| number of days before whitening | 23 | 5 |
| tensile strength (kgf/mm$^2$) | 1.63 | 1.45 |
| flame retardancy (UL 94VE ¼ inch) | V-0 | V-0 |
| content of halogen (wt %) | 0.001 | 0.001 |

Example 6 and

Comparative Example 13

Resin compositions having the following compositions were prepared.

70%: hydrotalcite compound particles (A-II or B-III; surface-treated with 2 wt % of isopropyltriisostearoyl titanate based on the hydrotalcite compound particles)
30%: polypropylene (of an impact resistant grade having an MFI of 2 g/10 min)
0.1%: antioxidant (Irganox 1010 of Ciba-Geigy AG.)
0.1%: antioxidant (DLTP of Yoshitomi Pharmaceutical Industries Ltd.)
0.3%: Bis(P-ethylbenzylidene)sorbitol (nucleating agent)

Test pieces were formed from the above resin compositions in the same manner as in Example 3 and evaluated for their thermal stability and flame retardancy. The results are shown in Table 4 below.

TABLE 4

| | A-II (Ex. 6) | B-III (C. Ex. 13) |
|---|---|---|
| hydrotalcite compound particles | | |
| number of days before whitening | 15 | 0.5 |
| Izod impact strength (kgf cm/cm) | 6.5 | 3.5 |
| tensile strength (kgf/mm$^2$) | 1.85 | 1.45 |
| 10 wt % weight reduction (hours) | 400 | 20 |

TABLE 4-continued

| flame retardancy (UL 94VE 1/16 inch) | V-0 | V-0 |
|---|---|---|
| Izod impact strength (kgf cm/cm) 150° C. × 7 days | 6.0 | 1≧ |
| tensile strength (kgf/mm²) 150° C. × 7 days | 1.81 | 0.5≧ |
| content of halogen (wt %) | 0.002 | 0.002 |

Example 7 and

Comparative Example 14

Resin compositions having the following compositions were prepared.
30%: hydrotalcite compound particles (A-II or B-III; surface-treated with 0.5 wt % of γ-aminopropyl trimethoxysilane based on the hydrotalcite compound particles)
7%: red phosphorus (Nova Excel 140 of Rin Kagaku Kogyo Co., Ltd.)
3%: carbon black (FEF manufactured by oil furnace process)
50%: polypropylene (of an impact resistant grade having an MFI of 2 g/10 min)
5%: polymer alloy compatibilizing agent (Taftec M-1943 of Asahi Chemical Industry Co., Ltd.)
5%: thermoplastic elastomer (Milastomer 7030N of Mitsui Kagaku Co., Ltd.)
0.1%: antioxidant (Irganox 1010 of Ciba-Geigy AG.)
0.1%: antioxidant (DLTP of Yoshitomi Pharmaceutical Industries Ltd.)
0.3%: Bis(P-ethylbenzylidene)sorbitol (nucleating agent)

Test pieces were formed from the above resin compositions in the same manner as in Example 3 and evaluated for their thermal stability and flame retardancy. The results are shown in Table 5 below.

TABLE 5

| hydrotalcite compound particles | A-II (Ex. 7) | B-III (C. Ex. 14) |
|---|---|---|
| number of days before whitening | 18 | 1.5 |
| Izod impact strength (kgf cm/cm) | 21.3 | 15.8 |
| tensile strength (kgf/mm²) | 2.65 | 2.10 |
| 10 wt % weight reduction (hours) | 450 | 45 |
| flame retardancy (UL 94VE 1/8 inch) | V-0 | V-0 |
| Izod impact strength (kgf cm/cm) 150° C. × 7 days | 13.6 | 1≧ |
| tensile strength (kgf/mm²) 150' C. × 7 days | 2.10 | 0.5≧ |
| content of halogen (wt %) | 0.004 | 0.004 |

Example 8

The following resin compositions (1) to (3) were prepared and test pieces were formed from these resin compositions in the same manner as in Example 3 and evaluated for their flame retardancy. In the case of nylon 6, kneading and injection molding were carried out at 250° C. As a result, 1/16-inch test pieces of the resin compositions (1) and (2) had level V-0 of flame retardancy in the UL94-VE test and a 1/4 inch test piece of the resin composition (3) passed the UL94-HB test. The contents of halogen in molded products obtained from the resin compositions (1) to (3) were 0.002 wt %, 0.002 wt % and 0.001 wt %, respectively.

(1)
68%: hydrotalcite compound particles (A-I)
32%: nylon 6 (of an injection molding grade having a specific gravity of 1.14)
0.2%: antioxidant (Irganox 1098 of Ciba-Geigy AG.)

(2)
70%: hydrotalcite compound particles (A-I)
30%: high-density polyethylene (MFI having an injection molding grade of 5.0 g/10 min)
0.1%: antioxidant (Irganox 1010 of Ciba-Geigy AG.)
0.1%: antioxidant (DLTP of Yoshitomi Pharmaceutical Industries Ltd.)

(3)
10%: hydrotalcite compound particles (A-I)
10%: red phosphorus (Nova Excel 140 of Rin Kagaku Kogyo Co., Ltd.)
5%: carbon black (FEF manufactured by oil furnace process)
70%: ABS resin (of an impact resistant grade having an MFI of 25 g/10 min)
5%: nylon 6 (of an injection molding grade having a specific gravity of 1.14)
0.2%: antioxidant (Irganox 1010 of Ciba-Geigy AG.)

Example 9

The following composition was prepared, roughly kneaded with an open roll at 70° C. and vulcanized after one day at 160° C. for 30 minutes to obtain a 1/8-inch thick plate. A 1/8-inch test piece for a UL94-VE test was formed from the obtained plate. The UL94-VE test was made on this test piece. As a result, the flame retardancy of the test piece was level V-1. The content of halogen in a molded product obtained from this composition was 0.02 wt %.

Composition
100 parts by weight: EPDM rubber (ethylene/propylene ratio=50/50 moles)
170 parts by weight: hydrotalcite compound particles (A-I)
3 parts by weight: dicumyl peroxide
0.5 part by weight: poly(2,2,4-trimethyl-1,2-dihydroquinoline)
1 part by weight: silane coupling agent (A-172 of Nippon Unicar Co., Ltd.)
1 part by weight: stearic acid
1 part by weight: sulfur Example 10

The following composition was prepared, kneaded with a kneader at about 30° C. and cured at 90° C. for 15 minutes to obtain a 1/8-inch thick plate. A 1/8-inch thick test piece for a UL94-VE test was formed from the obtained plate. The UL94-VE test was made on this test piece. As a result, the flame retardancy of the test piece was level V-0. The content of halogen in a molded product obtained from this composition was 0.05 wt %.

Composition
100 parts by weight: epoxy resin (specific gravity of 1.17)
100 parts by weight: hydrotalcite compound particles (A-I)
5 parts by weight: red phosphorus (Nova Excel 140 of Rin Kagaku Co., Ltd.)
1 part by weight: carbon black (FEF manufactured by oil furnace process)
10 parts by weight: curing agent (HY951 of Ciba-Geigy AG.)

1 part by weight: stearic acid
0.2 part by weight: Irganox 1010

Effect of the Invention

According to the present invention, even when a large amount of hydrotalcite compound particles are filled in a synthetic resin, a halogen-free flame retardant resin composition which rarely deteriorates by heat, has excellent dispersibility and is hardly whitened, and a molded article thereof can be obtained.

Therefore, a halogen-free flame retardant resin composition containing no halogen-based flame retardant and a molded article thereof can be provided. The resin composition has excellent workability, and the molded article does not generate harmful gas and dioxin at the time of combustion and has excellent physical strength.

What is claimed is:

1. A substantially halogen-free flame retardant synthetic resin composition having heat deterioration resistance comprising:

(a) a synthetic resin, and
    (b) hydrotalcite compound particles in an amount of more than 10 wt % and 80 wt % or less based on the total weight of the components (a) and (b), said hydrotalcite compound particles being represented by the following formula (1), which (i) have an average secondary particle diameter, measured by a laser diffraction scattering method, of 2 μm or less and (ii) contain an iron compound and a manganese compound in a total amount of 0.02 wt % or less in terms of metals, $$M_{1-x}Al_x(OH)_2A^{n-}{}_{x/n} \cdot mH_2O \quad (1)$$

wherein M is Mg and/or Zn, $A^{n-}$ is an anion having a valence of n, and x and m are positive numbers satisfying the following expressions:

$$0<x<0.5, \ 0 \leq m <1.$$

2. The synthetic resin composition of claim 1, wherein the content of a halogen compound in the flame retardant synthetic resin composition is 1 wt % or less in terms of elemental halogen.

3. The synthetic resin compositon of claim 1, wherein the content of a halogen compound in the flame retardant synthetic resin composition is 0.1 wt % or less in terms of elemental halogen.

4. The synthetic resin composition of claim 1, wherein the content of a halogen compound in the flame retardant synthetic resin composition is 0.01 wt % or less in terms of elemental halogen.

5. The synthetic resin composition of claim 1, wherein the hydrotalcite compound particles have an average secondary particle diameter. measured by a laser diffraction scattering method, of 0.4 to 1.0 μm.

6. The synthetic resin composition of claim 1, wherein the hydrotalcite compound particles contain an iron compound and a manganese compound in a total amount of 0.01 wt % or less in terms of metals.

7. The synthetic resin compositon of claim 1, wherein the hydrotalcite compound particles contain an iron compound, manganese compound, cobalt compound, chromium compound, copper compound, vanadium compound and nickel compound in a total amount of 0.02 wt % or less in terms of metals.

8. The synthetic resin composition of claim 1, wherein the hydrotalcite compound particles have a specific surface area, measured by the BET method, of 1 to 30 m²/g.

9. The synthetic resin composition of claim 1, wherein the hydrotalcite compound particles have a specific surface area measured by a BET method of 3 to 20 m²/g.

10. The synthetic resin composition of claim 1, wherein the hydrotalcite compound particles have a specific surface area measured by a BET method of 3 to 12 m²/g.

11. The synthetic resin composition of claim 1, wherein the hydrotalcite compound particles are dehydrated at 150 to 300° C.

12. The synthetic resin composition of claim 1 which comprises the hydrotalcite compound particles in an amount of 15 to 75 wt % based on the total weight of the synthetic resin and the hydrotalcite compound particles.

13. The synthetic resin composition of claim 1, wherein the synthetic resin is a polyolefin or a copolymer thereof.

14. The synthetic resin composition of claim 1, wherein the hydrotalcite compound particles are surface-treated with at least one surface treatment agent selected from the group consisting of higher fatty acids, anionic surfactants, phosphoric acid esters, coupling agents and esters of polyhydric alcohols and fatty acids.

15. The synthetic resin composition of claim 1 which further contains a flame retardant aid in an amount of 0.5 to 20 wt % based on the total weight of the synthetic resin and the hydrotalcite compound particles.

16. The synthetic resin composition of claim 15, wherein the flame retardant aid is red phosphorus powder or carbon powder.

17. A heat deterioration resistant flame retardant consisting essentially of hydrotalcite compound particles represented by the following general formula (1), which (i) have an average secondary particle diameter, measured by a laser diffraction scattering method, of 2 μm or less and (ii) contain an iron compound and a manganese compound in a total amount of 0.02 wt % or less in terms of metals:

$$M_{1-x}Al_x(OH)_2A^{n-}{}_{x/n} \cdot mH_2O \quad (1)$$

wherein M is Mg and/or Zn, $A^{n-}$ is an anion having a valence of n, and x and m are positive numbers satisfying the following expressions:

$$0<x<0.5, \ 0 \leq m <1.$$

18. The heat deterioration resistant flame retardant of claim 17, wherein the hydrotalcite compound particles have an average secondary particle diameter, measured by a laser diffraction scattering method, of 0.4 to 1.0 μm.

19. The heat deterioration resistant flame retardant of claim 17, wherein the hydrotalcite compound particles contain an iron compound and a manganese compound in a total amount of 0.01 wt % or less in terms of metals.

20. The heat deterioration resistant flame retardant of claim 17, wherein the hydrotalcite compound particles contain an iron compound, manganese compound, cobalt compound, chromium compound, copper compound, vanadium compound and nickel compound in a total amount of 0.02 wt % or less in terms of metals.

21. The heat deterioration resistant flame retardant of claim 17, wherein the hydrotalcite compound particles have a specific surface area measured by a BET method of 1 to 30 m²/g.

22. The heat deterioration resistant flame retardant of claim 17, wherein the hydrotalcite compound particles have a specific surface area measured by a BET method of 3 to 20 m²/g.

23. The heat deterioration resistant flame retardant of claim 17, wherein the hydrotalcite compound particles have a specific surface area measured by a BET method of 3 to 12 m2/ g.

24. A molded article of the synthetic resin composition of claim 1.

25. A substantially halogen-free flame retardant synthetic resin composition having heat deterioration resistance consisting essentially of:

(a) a synthetic resin, and (b) hydrotalcite compound particles in an amount of 15 wt % to 75 wt % based on the total weight of the components (a) and (b), said hydrotalcite compound particles being represented by the following formula (1), which (i) have an average secondary particle diameter, measured by a laser diffraction scattering method, of 0.4 to 1.0 μm and (ii) contain an iron compound and a manganese compound in a total amount of less than 0.01 wt % in terms of metals,

$$M_{1-x}Al_x(OH)_2A^{n-}{}_{x/n} \cdot mH_2O \tag{1}$$

wherein M is Mg and/or Zn, $A^{n-}$ is an anion having a valence of n, and x and m are positive numbers satisfying the following expressions:

$$0<x<0.5,\ 0\leq m<1.$$

and wherein the content of a halogen compound in the flame retardant synthetic resin composition is less than 0.1 wt % in terms of elemental halogen.

26. The synthetic resin composition of claim 25, wherein the amount of hydrotalcite particles is 30 wt % to 70 wt % based on total weight of the compounds (a) and (b).

27. The synthetic resin composition of claim 25, wherein the hydrotalcite compound particles have a specific surface area measured by a BET method of 3 to 20 $m^2/g$.

28. The synthetic resin composition of claim 25, wherein the synthetic resin is a polyolefin or a copolymer thereof.

29. The synthetic resin composition of claim 25, wherein the hydrotalcite compound particles are surface-treated with at least one surface treatment agent selected from the group consisting of higher fatty acids, anionic surfactants, phosphoric acid esters, coupling agents and esters of polyhydric alcohols and fatty acids.

30. The synthetic resin composition of claim 25 which further contains a flame retardant aid in an amount of 0.5 to 20 wt % based on the total weight of the synthetic resin and the hydrotalcite compound particles.

* * * * *